(12) United States Patent
Robota et al.

(10) Patent No.: US 7,928,035 B2
(45) Date of Patent: Apr. 19, 2011

(54) MODIFIED CATALYST SUPPORTS

(75) Inventors: Heinz J. Robota, Tulsa, OK (US); Shelly Goodman, Collinsville, OK (US)

(73) Assignee: Syntroleum Corporation, Tulsa, OK (US)

(*) Notice: Subject to any disclaimer, the term of this patent is extended or adjusted under 35 U.S.C. 154(b) by 0 days.

(21) Appl. No.: 12/823,982

(22) Filed: Jun. 25, 2010

(65) Prior Publication Data

US 2010/0261601 A1    Oct. 14, 2010

Related U.S. Application Data

(62) Division of application No. 11/008,883, filed on Dec. 10, 2004, now abandoned.

(60) Provisional application No. 60/529,310, filed on Dec. 12, 2003.

(51) Int. Cl.
  *B01J 23/00* (2006.01)
  *B01J 21/00* (2006.01)
  *B01J 23/08* (2006.01)
  *B01J 23/56* (2006.01)
  *C07C 27/06* (2006.01)

(52) U.S. Cl. ........ 502/355; 502/232; 502/263; 502/303; 502/325; 502/332; 518/715

(58) Field of Classification Search .......... 502/303, 502/325, 326, 332, 232, 263, 355
See application file for complete search history.

(56) References Cited

U.S. PATENT DOCUMENTS

| | | | |
|---|---|---|---|
| 2,419,272 A | 4/1947 | Marisic et al. | |
| 2,588,389 A | 3/1952 | Iler | |
| 4,257,874 A | 3/1981 | Bergna | |
| 4,477,595 A | 10/1984 | Madon | |
| 4,663,305 A | 5/1987 | Mauldin et al. | |
| 4,673,993 A | 6/1987 | McCaughey | |
| 4,677,084 A | 6/1987 | Bergna | |
| 4,708,945 A | 11/1987 | Murrell et al. | |
| 4,717,702 A | 1/1988 | Beuther et al. | |
| 4,752,596 A | 6/1988 | Bergna et al. | |
| 4,769,477 A | 9/1988 | Bergna | |
| 4,822,824 A | 4/1989 | Iglesia et al. | |
| 5,036,032 A | 7/1991 | Iglesia et al. | |
| 5,045,519 A | 9/1991 | Meyer et al. | |
| 5,059,574 A | 10/1991 | Abrevaya | |
| 5,140,050 A | 8/1992 | Mauldin et al. | |

(Continued)

FOREIGN PATENT DOCUMENTS

EP    0408300    1/1991

(Continued)

OTHER PUBLICATIONS

Alexander, "The Preparation of Monosilicic Acid", J.Am.Chem.Coc. 75, 2887 (1952).

(Continued)

*Primary Examiner* — Stanley Silverman
*Assistant Examiner* — Anthony J Zimmer
(74) *Attorney, Agent, or Firm* — Hall Estill Hardwick Gable Golden & Nelson, P.C.

(57) ABSTRACT

A modified catalyst support exhibiting attrition resistance and/or deaggregation resistance is provided. A catalyst composition including the modified catalyst support is also provided. A process to produce a modified catalyst support including treatment of a support slurry with a solution of monosilicic acid is provided. A process to use a catalyst including the modified catalyst support in a Fischer-Tropsch synthesis is provided.

20 Claims, 5 Drawing Sheets

U.S. PATENT DOCUMENTS

| | | | |
|---|---|---|---|
| 5,252,613 | A | 10/1993 | Chang et al. |
| 5,292,705 | A | 3/1994 | Mitchell |
| 6,235,677 | B1 | 5/2001 | Manzer et al. |
| 6,262,132 | B1 | 7/2001 | Singleton et al. |
| 6,740,621 | B2 | 5/2004 | Singleton et al. |
| 6,812,179 | B2 | 11/2004 | Huang et al. |
| 2002/0177630 | A1 | 11/2002 | Roy-Auberger et al. |

FOREIGN PATENT DOCUMENTS

| | | |
|---|---|---|
| EP | 0533451 | 3/1993 |

OTHER PUBLICATIONS

Iler, et al., "The Chemistry of Silica", p. 97 (1979).

Bergna, et al., "Selective Synthesis of Dimethylamine over Small-Pore Zeolites IV. Effects of SiO2 and Al2O3 Coatings", Journal of Catalysis 115, pp. 148-158 (1989).

Niwi, et al., "Thin Silica Layer on Alumina: Evidence of the Acidity in the Monolayer", Journal of Physical Chemistry, 94, pp. 6641-6445 (1990).

PCT/US2004/041820, International Search Report, mailed May 25, 2005.

| Sample # | Ex 1 | Ex. 2 | Ex. 3 | Ex. 4 | Ex. 5 | Ex. 6 | Ex. 7 | Ex. 8 | Ex. 9 | Ex. 10 | Ex. 15 | Comp. Ex. 3 |
|---|---|---|---|---|---|---|---|---|---|---|---|---|
| Catalyst Loading (cc) | 20 | 20 | 20 | 20 | 20 | 20 | 20 | 20 | 20 | 20 | 20 | 20 |
| Catalyst Density (g/cc) | 1.356667 | 1.56 | 1.35 | 1.36 | 1.36 | 1.34 | 1.4 | 1.38 | 1.33 | 1.33 | 1.33 | 1.32 |
| Catalyst Loading (g) | 27.13333 | 31.2 | 27 | 27.2 | 27.2 | 26.8 | 28 | 27.6 | 26.6 | 26.6 | 26.6 | 26.4 |
| RPM | 2000 | 2000 | 2000 | 2000 | 2000 | 2000 | 2000 | 2000 | 2000 | 2000 | 2000 | 2000 |
| HOS | 200 | 200 | 200 | 200 | 200 | 200 | 200 | 200 | 200 | 200 | 200 | 200 |
| Catalyst Layer Mass (g) | 38.57222 | 41.54 | 38.51667 | 40.76667 | 34.9 | 36.37363 | 39.19333 | 39.16667 | 44.90567 | 36.44333 | 41.36233 | 33596 |
| Unsettled Portion Mass (g) | 207.2056 | 149.98 | 187.7667 | 248.4433 | 200.6033 | 175.0427 | 186.8333 | 195.4197 | 194.311 | 195.334 | 200.4403 | 267.942667 |
| Bulk Ash (%) | 0.002794 | 0.0045 | 0.004383 | 0.0603 | 0.012333 | 0.049887 | 0.00247 | 0.004932 | 0.0446 | 0.009757 | 0.207667 | 1.35136667 |
| Catalyst in Unsettled Portion (% initial loading) | 0.019584 | 0.021632 | 0.030193 | 0.542787 | 0.088925 | 0.3338 | 0.016203 | 0.036747 | 0.324596 | 0.059598 | 1.508853 | 13.9551409 |
| Solids Ratio (filterable solids/initial catalyst loading) | | | | | | | | | | | | |
| 5.0 micron (%) | | | | | | | | | | | | 3.40474237 |
| 0.45micron (%) | | | | | | | | | | | | 2.03451278 |
| 0.1 micron (%) | | | | | | | | | | | | 1.15535907 |
| Non-filterable solids (%) | | | | | | | | | | | | 4.149939945 |

FIG. 4

MODIFIED CATALYST SUPPORTS

CROSS REFERENCE TO RELATED APPLICATIONS

This application is a divisional application of U.S. Ser. No. 11/008,883 filed Dec. 10, 2004, now abandoned which claims benefit under 35 U.S.C. §119(e) of U.S. Provisional Application Ser. No. 60/529,310 entitled "Attrition Resistant Catalyst Supports" filed on Dec. 12, 2003. The entire contents of each of the above-referenced applications are hereby expressly incorporated herein by reference.

FEDERALLY SPONSORED RESEARCH

Not applicable.

REFERENCE TO MICROFICHE APPENDIX

Not applicable.

FIELD OF THE INVENTION

The invention relates to modified catalyst supports showing attrition resistance, and/or, deaggregation-resistance, and/or regenerability. The invention further relates to a process to produce modified catalyst supports. The invention further relates to the use of Fischer-Tropsch catalysts including attrition-resistant catalyst, and/or, deaggregation-resistant and/or regenerable supports in Fischer-Tropsch synthesis.

BACKGROUND OF THE INVENTION

Supported catalysts used in Fischer-Tropsch reactors, including for example, slurry bubble column reactors and continuously stirred tank reactors ("CSTR"), are subjected to agitation causing significant collisions and frictional forces. Such collisions and forces can result in damage mechanisms which, over time, may cause attrition of the catalyst and/or catalyst support. Attrition of catalyst and/or catalyst support raises operating costs due to increased catalyst requirements. Moreover, attrition results in the production of fines which must be removed by filtration. The filtration process may cause loss of active catalyst in addition to removal of the fines, thereby further raising operating costs.

Catalyst supports used in fixed bed reactors may also be subjected to movement and collisions during batch or continuous regeneration processes. Consequently, some attrition may occur with fixed bed reactors. Moreover, catalyst supports, such as shaped extrudates, frequently show appreciable attrition during catalyst production, e.g., cobalt deposition onto the support. In such instances, the attrited fines must be removed from the catalyst product prior to use to prevent reactor plugging.

Attempts to reduce catalyst attrition include non-aqueous processes. Such processes require use of a non-aqueous solvent because the silicating agent used reacts rapidly with water which would displace the desired reaction of the silicate, with the hydroxyl or oxide groups on or near the surface of the catalyst support.

Yet another known process uses ethanol, i.e. non-aqueous, solutions of tetraethoxysilicate to deposit silicon onto catalyst supports for the purpose of suppressing the solubility of the support in aqueous acidic solutions which are typically encountered during preparation of the supported catalyst. However, the use of non-aqueous solvents raises costs due to the cost of the solvents themselves as well as the cost of specialized equipment.

SUMMARY OF THE INVENTION

Some embodiments of the invention provide a catalyst composition comprising a support material having between about 0.1 Si/nm$^2$ support surface area and about 10.6 Si/nm$^2$ support surface area deposited thereon wherein the Si atoms are bound directly to the support material through an oxygen atom.

Other embodiments of the invention provide a catalyst composition comprising a support material having between about 0.1 Si/nm$^2$ support surface area and about 10.6 Si/nm$^2$ support surface area deposited thereon wherein less than about 10 wt % of the silicon is in polymeric form.

Yet other embodiments of the invention provide a method of treating a catalyst support, comprising: contacting a support material with an attrition-suppressing composition comprising monosilicic acid thereby to provide a treated catalyst support.

Yet other embodiments of the invention provide a catalyst composition suitable for use in a Fischer-Tropsch process, comprising a mixture or reaction product of: an attrition-resistant support prepared by contacting a support material with an attrition-suppressing composition comprising monosilicic acid; a catalyst precursor composition comprising cobalt, a first modifier selected from the group of Ca, Sc, Ba, La, Hf, and combinations thereof; and at least one activator selected from the group of Ru, Rh, Pd, Re, Ir, Pt, and combinations thereof.

Yet other embodiments of the invention provide a Fischer-Tropsch product, comprising: a paraffinic wax; and less than about 50 ppm of gamma alumina particles having a diameter of less than about 20 nm; wherein the concentration of gamma alumina particles is determined following primary filtration.

BRIEF DESCRIPTION OF THE DRAWINGS

FIG. 4 is a chart showing the properties of the catalysts discussed in Examples 1-10.

DESCRIPTION OF EMBODIMENTS OF THE INVENTION

Figure 1:
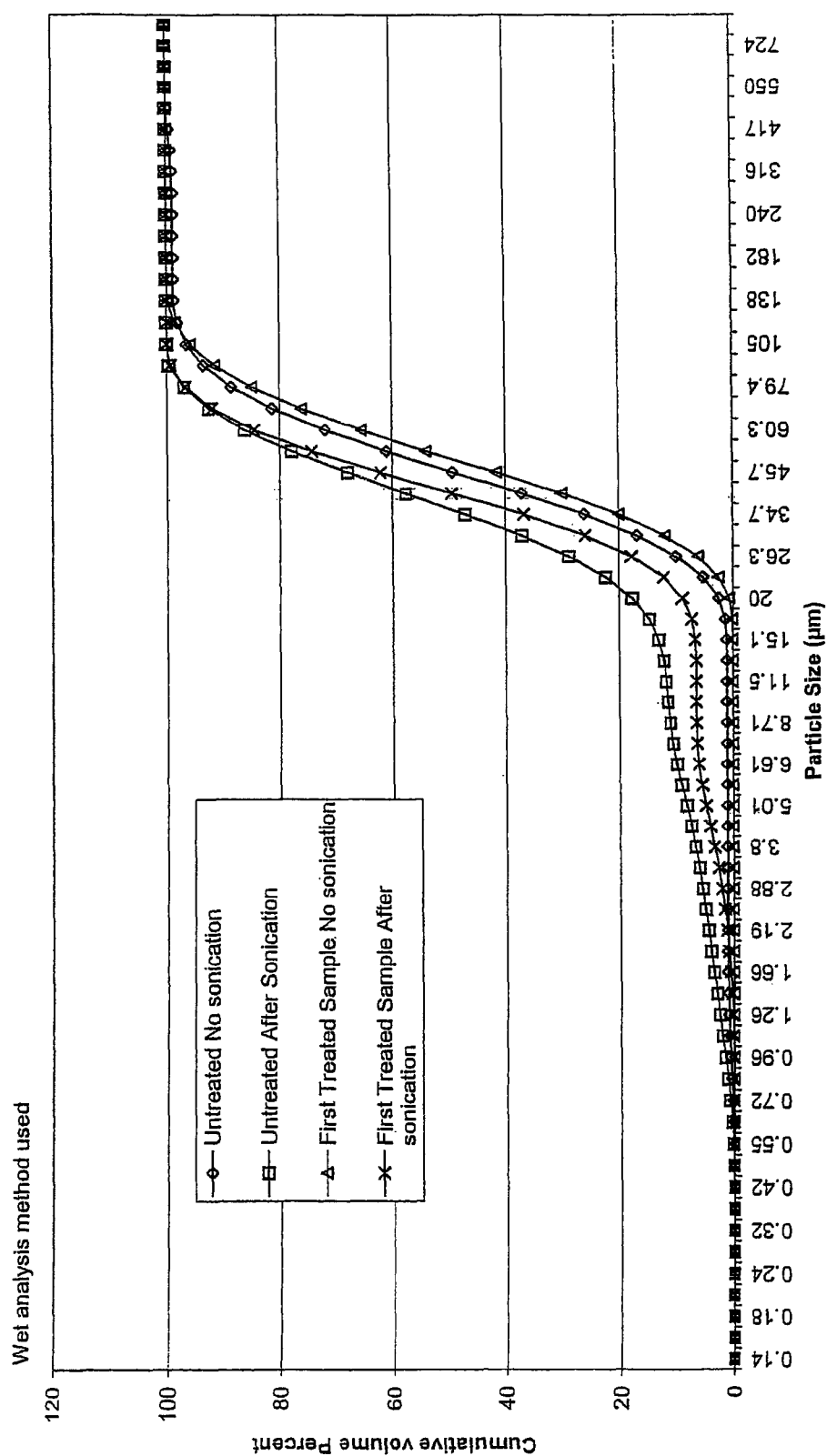
FIG. 1 is a graph of cumulative volume percent by particle size for an untreated support and for a first treated support before and after ultrasonic treatments.

The term "support" means any pre-formed inorganic support material having accessible hydroxyl and/or oxide groups and having penetrable pores. Supports, as used herein, may have any shape. The pores generally have openings greater than about 5 nm across the largest axis. The term "si/nm$^2$" as used herein means atoms si/nm$^2$.

The term "pre-formed" means a catalyst support which is formed, including for example extraction, washing, drying, and setting the particle size, prior to treatment with silicon compound and impregnation of an active metal, such as Group VIII metals. Catalyst supports included in the term "pre-formed" include, for example, spray dried, extruded, and pelletized supports.

The term "Fischer-Tropsch product" means the aggregate composition of hydrocarbons formed from synthesis gas by the FT synthesis process and remaining within the synthesis reactor vessel as a liquid at process conditions.

The term "primary filtration" means filtration of the Fischer-Tropsch product as it passes from the FT reactor and removing particles greater than about 5 μm.

The term "paraffinic wax" means a hydrocarbon consisting predominately of unbranched —CH— chains which are semi-solid to solid at room temperature and pressure.

The term "directly bound to a support material through an oxygen atom" means attachment through one or more single bonds to one or more oxygen atoms, each oxygen atom singly bonded to the metal of the support material.

In some embodiments of the process of the invention, monosilicic acid ("MSA") is prepared in accordance with the teachings of U.S. Pat. No. 2,588,389, incorporated herein and made a part hereof. In preferred embodiments of the invention, the MSA is made under conditions which minimize polymerization of the MSA. Such conditions are known in the art and examples of such conditions are discussed in the above cited reference. In some embodiments of the invention, the MSA is formed from a precursor at pHs between about 1.5 and about 3.5 and at temperatures between about 0° C. and about 5° C. In some embodiments, the MSA is formed from a precursor at a temperature of up to about 25° C. In preferred embodiments, the MSA is formed from a precursor at a temperature between about 0° and about 8° C.; in a most preferred embodiment, the MSA is formed from a precursor at a temperature between about 0° C. and about 5° C. The precursor may be any aqueous solution of a silicate, including sodium silicates such as sodium orthosilicate and sodium metasilicate. The MSA solution generally contains between about 0.1% to about 1.0% Si to total solution by weight. Following formation of the MSA, the MSA solution is preferably contacted with the support within as short a time as is practicable. The MSA is very reactive, readily forming polymers by reaction with itself or alternatively, reacting with other oxidized surfaces, such as the surfaces of typical catalyst supports. The contacting of the MSA and catalyst support may occur by batch mixing or by metered addition of the MSA solution to an aqueous suspension of the support material. When batch mixing is used, the support solution is generally vigorously stirred during MSA addition to maximize contact between the MSA and support particles. When metered addition is used, the MSA is added at a rate which minimizes self-polymerization and favors reaction between the MSA and the support by maintaining a relatively low concentration of unreacted MSA to total solution. Nevertheless, the reaction between the MSA and some catalyst supports, such as alumina, may be faster than MSA self polymerization. In such cases, about a monolayer of the silicon may be readily deposited on the support particles even where batch addition of the MSA is used and higher MSA concentrations in the mixture occur. The MSA and support mixture may be stirred, preferably vigorously stirred, during and/or following mixing to promote contact between the MSA and the surface of the support particles. In preferred embodiments of the invention, the amount of water used to form the aqueous suspension of the support material is minimized, with only an amount necessary to permit vigorous stirring to be used. Such amount of water will vary according to type, size and shape of support used. Generally, the MSA solution may be contacted with the support for a period of between about 1 minute to over 2 hours before subsequent processing. The MSA solution may be contacted with the support at temperatures ranging from between about 0° C. and about 95° C.

When higher temperatures are used, the MSA reagent may be added to the support slurry at a higher rate due to a faster reaction rate between the MSA and the support material. Furthermore, even at a temperature below 5° C., the MSA reagent exhibits some self-polymerization. Even with some degree of MSA self-polymerization, the active agent in the MSA reagent/support slurry mixture appears to be predominantly the monomeric form of silicic acid. Relatively rapid hydrolysis, i.e., depolymerization, of low polymers of MSA has been observed at low unreacted MSA concentrations. Even at the end of the MSA addition, where the concentration of unreacted silicate climbs to about 500 ppm in the mixture, there is a preponderance of the active monomer.

Following binding of the MSA onto the support, the mixture may be cooled, excess solution may be decanted, and the treated support washed with water to remove excess acid. The decant-wash cycle may be repeated. Following the final decanting, the remaining dense slurry may be filtered prior to drying and calcining. The slurry is then dried followed by calcining at temperatures ranging from about 400° C. to about 800° C. and preferably at about 600° C.

The filter pore size used will be generally dependent upon support size and shape. Indeed, the dense slurry need not be filtered but rather may be subjected to any of a number of known techniques for dewatering dense slurries. For example, the dense slurry may be centrifuged. Typically, the treated support material is dried at temperatures between about 100° C. to about 200° C., preferably at about 150° C. until the material becomes flowable. It will be understood that in commercial operations, the dewatered slurry may be dried and calcined continuously with a front portion of a calcining zone acting as a drier by adjustment of temperature ramp and flow rate. In most applications, the support will be maintained at the calcining temperature for at least about one hour.

The terms "support(s)" and "support material(s)" are used interchangeably herein. Supports useful in the invention include any preformed, inorganic particles having any shape, including for example substantially spherical or extrudates, having accessible hydroxyl or oxide groups, and having pores penetrable as necessary for use in a Fischer-Tropsch synthesis. Examples of suitable support materials include, for example, alumina, including gamma, eta, theta, delta, and rho alumina, anatase and rutile titania, magnesia, zirconia or other refractory oxides selected from Groups III, IV, V, VI and VIII. The support, prior to treatment according to the invention, may have a diameter or equivalent diameter ranging from about 0.025 mm to about 0.2 mm. The amount of Si bound directly to the support material may range from between about 0.77 $Si/nm^2$ to about 10.6 $Si/nm^2$.

As previously mentioned, monosilicic acid, $Si(OH)_4$, may undergo self-polymerization with the extent of polymerization dependent upon temperature, pressure and concentration of silicate. Consequently, preparation of practical solutions of silicic acid will contain not only the silicic acid monomer, but higher polymeric forms as well. Solutions most effective for the purposes of this invention will be composed of the lowest concentration of higher polymeric forms. For the purposes of this invention, a high quality solution includes a higher proportion of monomeric silicate than polymeric silicate. The quality of the solution may be characterized using a colorimetric determination based on the formation of aqueous silico-molybdate species as is known in the art.

The extent of MSA polymerization may be monitored by using spectrophotometric techniques known in the art. One known spectrophotometric method relies on the depolymerization of low molecular weight polymers of $SiO_2$ and the formation of silicomolybdic acid which has a yellow color. The reaction of $Si(OH)_4$ with molybdic acid is extremely rapid. The rate of formation of $Si(OH)_4$ is inversely proportional to the length of the silicate polymer. Therefore, the lower the degree of polymerization, the more rapidly the solution reaches its final color intensity.

Several tests were made using this spectrophotometric technique in which the color change was monitored using a spectrophotometer set to 410 nm. MSA monomer achieved its final color in less than two minutes. The MSA cubic octomer requires more than ten minutes to reach its final color and exhibits less than 50% of its final color in the first two minutes. Yet higher polymers require even longer to exhibit their final color intensity and show a correspondingly lower fraction of their color at two minutes or less. In some embodiments of the invention, the test solutions achieved about 80% of their final color within two minutes and achieved their final color within six to ten minutes. Solutions were deemed suitable for use when about >90% of the final color was developed within 5 minutes. In preferred embodiments of the invention, the test solutions produced >90% of their color within 2 minutes, indicating very high monomer content at the outset.

The treated support may be used for the preparation of a catalyst, such as a Fischer-Tropsch catalyst. Any of a number of catalyst preparation methods, for example impregnation of a Group VIII metal, are known in the art and may be utilized with the treated support.

A Fischer-Tropsch catalyst incorporating the attrition-resistant catalyst support of the invention includes a catalytically active amount of a catalytic metal, usually between about 1 wt % and 100 wt %, preferably between 2 wt % and 60 wt %, and most preferably between about 10 wt % and about 30 wt %. Modifiers and/or activators may be included in the catalyst composition and modifiers and activators useful in Fischer-Tropsch catalysts are well known in the art. Activators include, for example, Ru, Rh, Pd, Re, Ir, Pt, and combinations thereof. Modifiers include, for example, Ca, Sc, Ba, La, Hf, and combinations thereof. Modifiers and/or activators are usually present in amounts less than that of the primary catalytic metal.

One typical catalyst preparation method utilizes impregnation by incipient wetness. For example, a cobalt nitrate salt may be impregnated by incipient wetness onto a titania, silica, or alumina support, optionally followed by impregnation with a modifiers. The catalyst may then be calcined at about 250° C. to about 500° C. to covert the metal salt to its corresponding oxide. The oxide may then be reduced by treatment with hydrogen or a hydrogen containing gas at about 300° C. to about 500° C. for a time sufficient to substantially reduce the oxide to the elemental or catalytic form of the metal. Other well known catalyst preparation methods are those disclosed in U.S. Pat. Nos. 4,673,993; 4,717,702; 4,477,595; 4,663,305; 4,822,824; 5,036,032; 5,140,050; 5,252,613; and 5,292,705, the disclosures of which are incorporated herein by reference.

Figure 2:
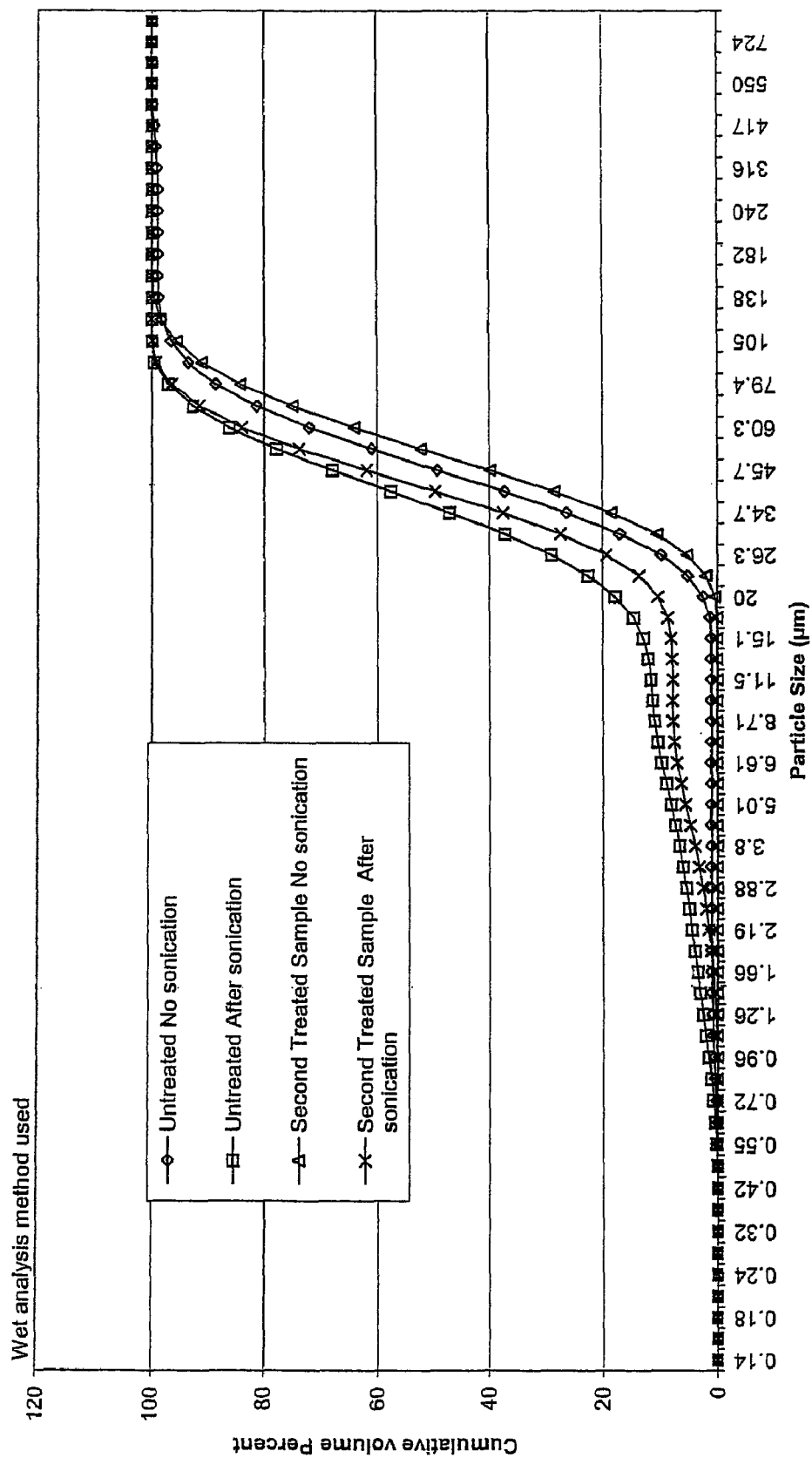
FIG. 2 is a graph of cumulative volume percent by particle size for an untreated support and for a second treated support before and after ultrasonic treatments.

The supports treated as described herein display improved attrition resistance over untreated supports. One method for gauging the relative attrition resistance of supports is based on the use of an ultrasonic probe to produce conditions wherein the support particles collide with one another with a high frequency and sufficient energy to potentially cause fracture of the support particles. Such test method is discussed in U.S. Pat. No. 6,262,132, which is incorporated herein by reference. FIG. 1 shows the results of such ultrasonic testing on a support, both a first treated and untreated samples of such support. The curves in FIG. 1 show the cumulative volume percent as a function of particle size for these samples, before and after ultrasonic testing. Specifically, the curve shown with diamond data points depicts the particle size cumulative distribution of an untreated support before ultrasonic treatment; the curve shown with triangle data points depicts the particle size cumulative distribution of a first treated support before ultrasonic treatment; the curve shown with box data points depicts the particle size cumulative distribution of an untreated support following ultrasonic treatment; the curve shown with "X" data points depicts the particle size cumulative distribution of the first treated support following ultrasonic treatment. As can be seen from FIG. 1, the untreated support shows a significantly greater shift to smaller particle size following ultrasonic treatment than that displayed by the treated support. The same trend is shown in FIG. 2 with the untreated support following ultrasonic testing showing a significantly greater shift to smaller particle sizes than that of a second treated support following ultrasonic testing. The support material used in the examples shown in FIGS. 1 and 2 are the same material but separate samples of such material. The untreated sample is the same in both FIGS. 1 and 2. Referring to both FIGS. 1 and 2, the untreated supports following ultrasonic testing exhibit a population of particles smaller than 20 microns in diameter. While the treated supports following ultrasonic testing also exhibit particles having diameters (or effective diameters) of less than 20 microns, the sub-micron population in the treated support is about one-hail that seen in the untreated supports. Moreover, the overall shift to smaller particle sizes is also less for the treated supports than for the untreated supports.

Figure 3:
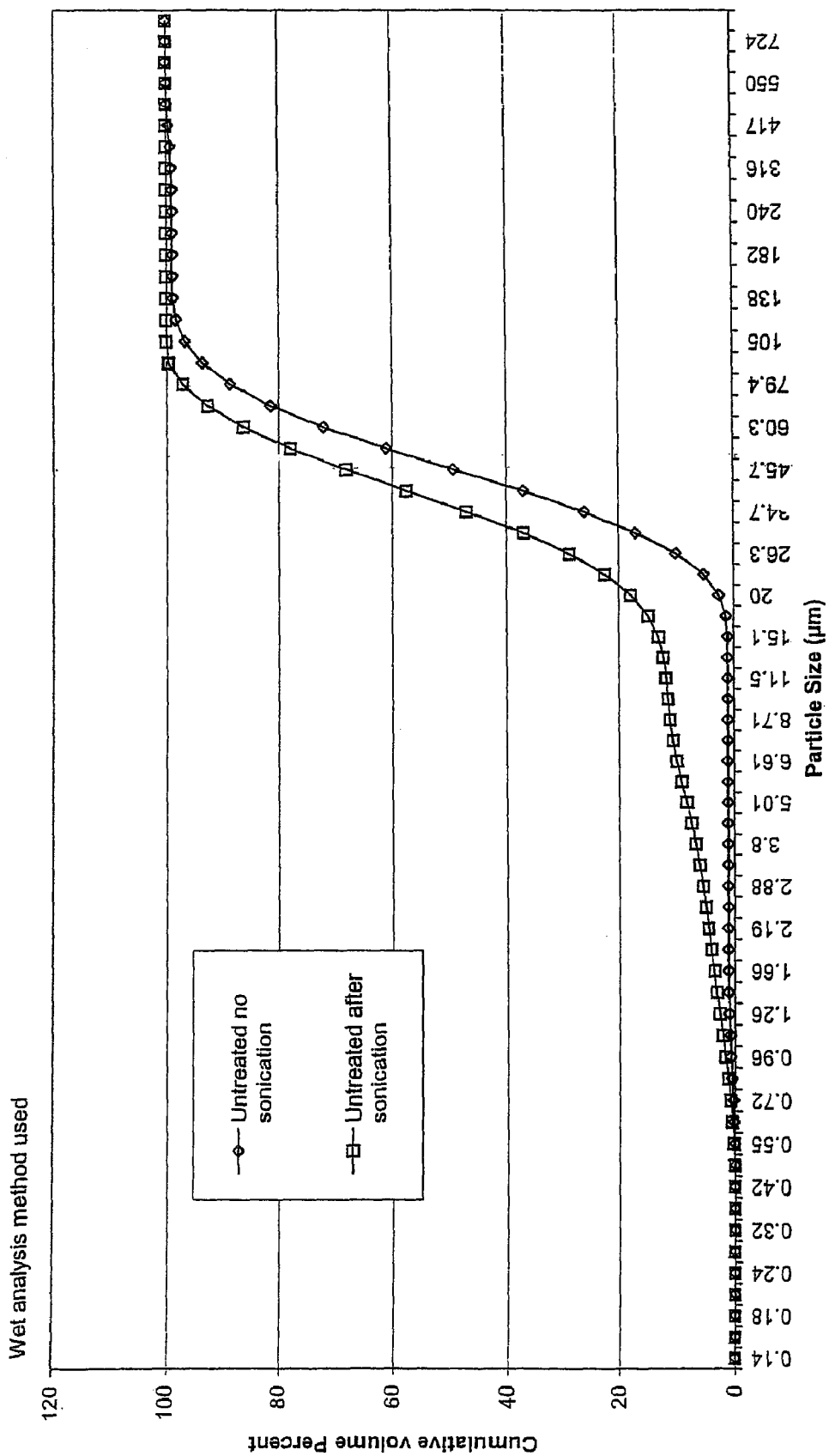
FIG. 3 is a graph of cumulative volume percent by particle size for an untreated support before and following ultrasonic treatment.

The ultrasonic testing discussed above was completed on an untreated support sample and the cumulative volume percent vs. particle size of such sample before and after ultrasonic testing is shown in FIG. 3. The cumulative volume percent vs. particle size was then remeasured for the untreated sample subjected to ultrasonic testing alter about six months. The particle size distribution remains substantially identical to that measured in the earlier testing thereby demonstrating that the ultrasonic test is highly rigorous with excellent reproducibility.

In addition to attrited catalyst particles, it has been observed that Fischer-Tropsch product waxes may also contain particulates significantly smaller in size than attrition products. NMR analysis of these particulates, according to known methods, shows these solids to be comprised substantially of gamma alumimi crystallites. TEM analysis of these particulates, using known methods, shows that these solids have a size of less than about 20 nm along any crystalline axis. Such gamma alumina crystallites are believed to be deaggregated fragments from the catalyst particles. Because the deaggregated gamma alumina fragments are significantly smaller in size than attrition products, the deaggregated gamma alumina may be separated from the attrition products. The composition of the deaggregated gamma alumina product differs from the composition of the original catalyst. Whereas the catalyst typically has a composition of about 20 wt % elemental cobalt, and 70 wt % $Al_2O_3$, the deaggregated gamma alumina product are depleted of cobalt, typically containing about 3 wt % to about 4 wt % elemental Co and about 95 wt % $Al_2O_3$.

EXAMPLE 1

Preparation of Catalyst Sample I

MSA reagent solution was prepared with 94.9 g TEOS rapidly added to 4 L of acidified-demineralized water under vigorous stirring. Sufficient $HNO_3$ was added to the water to bring the pH to between 2.2 and 2.5 and held between 3° C. and 8° C. 15 minutes after TEOS addition, an aliquot was removed and the rate of color change tested. Greater than 90% of the full color developed within 5 minutes. In a separate stirred, heated vessel, a slurry of the alumina support containing 640 g alumina suspended in 2L of demineralized water was heated. The slurry was held at 50°±5° C. throughout the addition of the MSA reagent, which was added at a rate of 35 ml/min. Following completion of the MSA addition, the slurry was stirred and kept at 50°±5° C. until >95% of the silicon was reacted with the alumina. Once reaction was complete, stirring was stopped, the solids allowed to settle, and the clear mother liquor decanted from the vessel. The remaining dense slurry was vacuum filtered to remove the remainder of the solution. The filtered solid was spread onto a drying tray to a thickness less than 1.5 cm and dried overnight in an oven held at 140° C. This dried powder was then calcined in a dish at 600° C. for 4 hours.

Catalyst was prepared to have a nominal composition of 20% Co, 1% La, and 0.1% Ru in the calcined form. 200 g of the Si-modified catalyst support were charged to a steam-jacketed, rotating impregnation vessel. A saturated solution prepared from $Co(NO_3)_2$ $6H_2O$ and demineralized water was prepared in advance. 172.5 g of this saturated Co solution was used for the first impregnation pass. 6.25 g of $La(NO_3)_3$ $6H_2O$ were dissolved in 20 g of demineralized water and combined with the Co solution. The amount of solution was selected so as to produce an incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≦2 cm. The dishes are placed into an electrically heated oven which is ramped from ambient to 120° C., held at 120° C. for 2 hours, ramped to 350° cover a two hour period and held at 350° C. for an additional 2 hours. After cooling to ambient, the calcined powder is again transferred to the impregnation vessel. To 187 g of a second charge of the saturated cobalt solution, 1.8 g of a 13.5% Ru solution of $Ru(NO)(NO_3)_3$ is added. This second impregnation solution is again applied to the substrate in the tumbling impregnator and dried and calcined as following the first pass.

EXAMPLE 2

Preparation of Catalyst Sample 2

MSA reagent solution was prepared with 73.6 g TEOS rapidly added to 667 ml of acidified demineralized water under vigorous stirring. Sufficient $HNO_3$ was added to the water to bring the pH to between 2.2 and 2.5 and held between 3° C. and 8° C. 15 minutes after TEOS addition, an aliquot was removed and the rate of color change tested. Greater than 90% of the full color developed within 5 minutes. In a separate stirred, heated vessel, a slurry of the alumina support containing 100 g alumina suspended in 333 ml of demineralized water was heated. The slurry was held at 50°±5° C. throughout the addition of the MSA reagent, which was added at a rate of 5ml/min. Following completion of the MSA addition, the slurry was stirred and kept at 50°±5° C. until >95% of the silicon was reacted with the alumina. Once reaction was complete, stirring was stopped, the solids allowed to settle, and the clear mother liquor decanted from the vessel. The remaining dense slurry was vacuum filtered, to remove the remainder of the solution. The filtered solid was spread onto a drying tray to a thickness less than 1.5 cm and dried 6 h in a static muffle furnace oven held at 140° C. This dried powder was then calcined in a dish at 600° C. for 4 hours.

Catalyst was prepared to have a nominal composition of 20% Co, 1% La, and 0.1% Ru in the calcined form. 93.8 g of the Si-modified catalyst support were charged to a steam-jacketed, rotating impregnation vessel. A saturated solution prepared from $Co(NO_3)_2$ $6H_2O$ and demineralized water was prepared in advance. 87.6 g of this saturated Co solution was used for the first impregnation pass. 4.08 g of $La(NO_3)_3$ $6H_2O$ were dissolved in 10 g of demineralized water and combined with the Co solution. The amount of solution was selected so as to produce an incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≦2 cm. The dishes are placed into an electrically heated oven which is ramped from ambient to 120° C., held at 120° C. for 2 hours, ramped to 350° C. over a two hour period and held at 350° C. for an additional 2 hours. After cooling to ambient, the calcined powder is again transferred to the impregnation vessel. To 87.5 g of a second charge of the saturated cobalt solution, 0.97 g of a 13.5% Ru solution of $Ru(NO)(NO_3)_3$ is added. This second impregnation solution is again applied to the substrate in the tumbling impregnator and dried and calcined as following the first pass.

EXAMPLE 3

Preparation of Catalyst Sample 3

MSA reagent solution was prepared with 94.9 g TEOS rapidly added to 4 L of acidified demineralized water under vigorous stirring. Sufficient $HNO_3$ was added to the water to bring the pH to between 2.2 and 2.5 and held between 3° C. and 8° C. 15 minutes after TEOS addition, an aliquot was removed and the rate of color change tested. Greater than 90% of the full color developed within 5 minutes. A slurry of the alumina support containing 640 g alumina suspended in 2L of demineralized water was added to the MSA. The mixture was then heated to 50°±5° C. The mixture was stirred and kept at 50°±5° C. until >95% of the silicon was reacted with the alumina. Once reaction was complete, stirring was stopped, the solids allowed to settle, and the clear mother liquor decanted from the vessel. The remaining dense slurry was vacuum filtered to remove the remainder of the solution. The filtered solid was spread onto a drying tray to a thickness less than 1.5 cm and dried overnight in an oven held at 140° C. This dried powder was then calcined in a dish at 600° C. for 4 hours.

Catalyst was prepared to have a nominal composition of 20% Co, 1% La, and 0.1% Ru in the calcined form. 200 g of the Si-modified catalyst support were charged to a steam-jacketed, rotating impregnation vessel. A saturated solution prepared from $Co(NO_3)_2$ $6H_2O$ and demineralized water was prepared in advance. 172.5 g of this saturated Co solution was used for the first impregnation pass. 6.25 g of $La(NO_3)_3$ $6H_2O$ were dissolved in 20 g of demineralized water and combined with the Co solution. The amount of solution was selected so as to produce and incipiently wet powder when applied to the support in the rotating vessel. The impregnated powder is allowed to tumble in the impregnator for one hour at ambient temperatures and then steamed to dryness over a three hour period. The powder is cooled to 5 ambient, weighed, and transferred to shallow calcining dishes such that the powder depth is ≦2 cm. The dishes are placed into an electrically heated oven which is ramped from ambient to 120° C., held at 120° C. for 2 hours, ramped to 350° C. over a two hour period and held at 350° C. for an additional 2 hours. After cooling to ambient, the calcined powder is again transferred to the impregnation vessel. To 187 g of a second charge of the saturated cobalt solution, 1.8 g of a 13.5% Ru solution of Ru(NO)(NO$_3$)$_3$ is added. This second impregnation solution is again applied to the substrate in the tumbling impregnator and dried and calcined as following the first pass.

EXAMPLE 4

Preparation of Catalyst Sample 4

MSA reagent solution was prepared with 38 g TEOS rapidly added to 1.62L of acidified demineralized water under vigorous stirring. Sufficient HNO$_3$ was added to the water to bring the pH to between 2.2 and 2.5 and held between 3° C. and 8° C. 15 minutes after TEOS addition, an aliquot was removed and the rate of color change tested. Greater than 90% of the fun color developed within 5 minutes. This MSA solution was kept cold and held for ~60 hrs. A slurry of the alumina support containing 640 g alumina suspended in 768 ml of demineralized water was added to the MSA. The mixture was then heated to 50° ±5° C. The mixture was stirred and kept at 50° ±5° C. until >95% of the silicon was reacted with the alumina. Once reaction was complete, stirring was stopped, the solids allowed to settle, and the clear mother liquor decanted from the vessel. The remaining dense slurry was vacuum filtered to remove the remainder of the solution. The filtered solid was spread onto a drying tray to a thickness less than 1.5 cm and dried overnight in an oven held at 140° C. This dried powder was then calcined in a dish at 600° C. for 4 hours.

Catalyst was prepared to have a nominal composition of 20% Co, 1% La, and 0.1% Ru in the calcined form. 200 g of the Si-modified catalyst support were charged to a steam-jacketed, rotating impregnation vessel. A saturated solution prepared from Co(NO$_3$)$_2$ 6H$_2$O and demineralized water was prepared in advance. 172.5 g of this saturated Co solution was used for the first impregnation pass. 6.25 g of La(NO$_3$)$_3$ 6H$_2$O were dissolved in 20 g of demineralized water and combined with the Co solution. The amount of solution was selected so as to produce and incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≦2 cm. The dishes are placed into an electrically heated oven which is ramped from ambient to 120° C., held at 120° C. for 2 hours, ramped to 350° C. over a two hour period and held at 350° C. for an additional 2 hours. After cooling to ambient, the calcined powder is again transferred to the impregnation vessel. To 194 g of a second charge of the saturated cobalt solution, 1.82 g of a 13.5% Ru solution of Ru(NO)(NO$_3$)$_3$ is added. This second impregnation solution is again applied to the substrate in the tumbling impregnator and dried and calcined as following the first pass.

EXAMPLE 5

Preparation of Catalyst Sample 5

MSA reagent solution was prepared with 38 g TEOS rapidly added to 1.62 L of acidified demineralized water under vigorous stirring. Sufficient HNO$_3$ was added to the water to bring the pH to between 2.2 and 2.5 and held between 3° C. and 8° C. 15 minutes after TEOS addition, an aliquot was removed and the rate of color change tested. Greater than 90% of the full color developed within 5 minutes. A slurry of the alumina support confining 640 g alumina suspended in 768 ml of demineralized water was added to the MSA. The mixture was then heated to 50° ±5° C. The mixture was stirred and kept at 50° ±5° C. until >95% of the silicon was reacted with the alumina. Once reaction was complete, stirring was stopped, the solids allowed to settle, and the clear mother liquor decanted from the vessel. The remaining dense slurry was vacuum filtered to remove the remainder of the solution. The filtered solid was spread onto a drying tray to a thickness less than 1.5 cm and dried overnight in an oven held at 140° C. This dried powder was then calcined in a dish at 600° C. for 4 hours.

Catalyst was prepared to have a nominal composition of 20% Co, 1% La, and 0.1% Ru in the calcined form. 200 g of the Si-modified catalyst support were charged to a steam-jacketed, rotating impregnation vessel. A saturated solution prepared from Co(NO$_3$) 6H$_2$O and demineralized water was prepared in advance. 172.5 g of this saturated Co solution was used for the first impregnation pass. 6.25 g of La(NO$_3$)$_3$ 6H$_2$O were dissolved in 20 g of demineralized water and combined with the Co solution. The amount of solution was selected so as to produce and incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≦2 cm. The dishes are placed into an electrically heated oven which is ramped from ambient to 120° C., held at 120° C. for 2 hours, ramped to 350° C. over a two hour period and held at 350° C. for an additional 2 hours. After cooling to ambient, the calcined powder is again transferred to the impregnation vessel. To 192 g of a second charge of the saturated cobalt solution, 1.82 g of a 13.5% Ru solution of Ru(NO)(NO$_3$)$_3$ is added. This second impregnation solution is again applied to the substrate in the tumbling impregnator and dried and calcined as following the first pass.

EXAMPLE 6

Preparation of Catalyst Sample 6

MSA reagent solution was prepared with 94.9 g TEOS rapidly added to 4 L of acidified demineralized water under vigorous stirring. Sufficient HNO$_3$ was added to the water to bring the pH to between 2.2 and 2.5 and held at room temperature ~22° C. 15 minutes after TEOS addition, an aliquot was removed and the rate of color change tested. Greater than 90% of the full color developed within 5 minutes. 640 g of alumina was added to the MSA. The mixture was then heated to 50° ±5° C. The mixture was stirred and kept at 50° ±5° C. until >95% of the silicon was reacted with the alumina. Once reaction was complete, stirring was stopped, the solids allowed to settle, and the clear mother liquor decanted from the vessel. The remaining dense slurry was vacuum filtered to remove the remainder of the solution. The filtered solid was spread onto a drying tray to a thickness less than 1.5 cm and dried overnight in an oven held at 140° C. This dried powder was then calcined in a dish at 600° C. for 4 hours.

Catalyst was prepared to have a nominal composition of 20% Co, 1% La, and 0.1% Ru in the calcined form. 200 g of the Si-modified catalyst support were charged to a steam-jacketed, rotating impregnation vessel. A saturated solution prepared from Co(NO$_3$)$_2$ 6H$_2$O and demineralized water was prepared in advance. 172.5 g of this saturated Co solution was used for the first impregnation pass. 6.25 g of La(NO$_3$)$_3$ 6H$_2$O were dissolved in 20 g of demineralized water and combined with the Co solution. The amount of solution was selected so as to produce and incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≦2 cm. The dishes are placed into an electrically heated oven which is ramped from ambient to 120° C. held at 120° C. for 2 hours, ramped to 350° C. over a two hour period and held at 350° C. for an additional 2 hours. After cooling to ambient, the calcined powder is again transferred to the impregnation vessel. To 187 g of a second charge of the saturated cobalt solution, 1.8 g of a 13.5% Ru solution of Ru(NO)(NO$_3$)$_3$ is added. This second impregnation solution is again applied to the substrate in the tumbling impregnator and dried and calcined as following the first pass.

EXAMPLE 7

Preparation of Catalyst Sample 7

MSA reagent solution was prepared with 89.3 g TEOS rapidly added to 2 L of acidified demineralized water under vigorous stirring. Sufficient HNO$_3$ was added to the water to bring the pH to between 2.2 and 2.5 and held between 3° C. and 8° C. 15 minutes after TEOS addition, an aliquot was removed and the rate of color change tested. Greater than 90% of the full color developed within 5 minutes. In a separate stirred, heated vessel, a slurry of the alumina support containing 300 g alumina suspended in 1 L of demineralized water was heated. The slurry was held at 50° ±5° C. throughout the addition of the MSA reagent, which was added at a rate of 15 ml/min. Following completion of the MSA addition, the slurry was stirred and kept at 50° ±5° C. until >95% of the silicon was reacted with the alumina. Once reaction was complete, stirring was stopped, the solids allowed to settle, and the clear mother liquor decanted from the vessel. The remaining dense slurry was vacuum filtered to remove the remainder of the solution. The filtered solid was spread onto a drying tray to a thickness less than 1.5 cm and dried 6 hours in a static muffle furnace held at 140° C. This dried powder was then calcined in a dish at 600° C. for 4 hours.

Catalyst was prepared to have a nominal composition of 20% Co, 1% La, and 0.1% Ru in the calcined form. 200 g of the Si-modified catalyst support were charged to a steam-jacketed, rotating impregnation vessel. A saturated solution prepared from Co(NO$_3$)$_2$ 6H$_2$O and demineralized water was prepared in advance. 172.5 g of this saturated Co solution was used for the first impregnation pass. 6.25 g of La(NO$_3$)$_3$ 6H$_2$O were dissolved in 20 g of demineralized water and combined with the Co solution. The amount of solution was selected so as to produce and incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≦2 cm. The dishes are placed into an electrically heated oven which is ramped from ambient to 120° C., held at 120° C. for 2 hours, ramped to 350° C. over a two hour period and held at 350° C. for an additional 2 hours. After cooling to ambient, the calcined powder is again transferred to the impregnation vessel. To 185 g of a second charge of the saturated cobalt solution, 1.78 g of a 13.5% Ru solution of Ru(NO)(NO$_3$)$_3$ is added. This second impregnation solution is again applied to the substrate in the tumbling impregnator and dried and calcined as following the first pass.

EXAMPLE 8

Preparation of Catalyst Sample 8

MSA reagent solution was prepared with 68 g TEOS rapidly added to 2 L of acidified demineralized water under vigorous stirring. Sufficient HNO$_3$ was added to the water to bring the pH to between 2.2 and 2.5 and held between 3° C. and 8° C. 15 minutes after TEOS addition, an aliquot was removed and the rate of color change tested. Greater than 90% of the full color developed within 5 minutes. In a separate stirred, heated vessel, a slurry of the alumina support containing 300 g alumina suspended in 1 L of demineralized water was heated. The slurry was held at 50° ±5° C. throughout the addition of the MSA reagent, which was added at a rate of 15 all/min. Following completion of the MSA addition, the slurry was stirred and kept at 50° ±5° C. until >95% of the silicon was reacted with the alumina. Once reaction was complete, stirring was stopped, the solids allowed to settle, and the clear mother liquor decanted from the vessel. The remaining dense slurry was vacuum filtered to remove the remainder of the solution. The filtered solid was spread onto a drying tray to a thickness less than 1.5 cm and dried 6 h in a static muffle furnace held at 140° C. This dried powder was then calcined in a dish at 600° C. for 4 hours.

Catalyst was prepared to have a nominal composition of 20% Co, 1% La, and 0.1% Ru in the calcined form. 200 g of the Si-modified catalyst support were charged to a steam-jacketed, rotating impregnation vessel. A saturated solution prepared from Co(NO$_3$)$_2$ 6H$_2$O and demineralized water was prepared in advance. 172.5 g of this saturated Co solution was used for the first impregnation pass. 6.25 g of La(NO$_3$)$_3$ 6H$_2$O were dissolved in 20 g of demineralized water and combined with the Co solution. The amount of solution was selected so as to produce and incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≦2 cm. The dishes are placed into an electrically heated oven which is ramped from ambient to 120° C., held at 120° C. for 2 hours, ramped to 350° C. over a two hour period and held at 350° C. for an additional 2 hours. After cooling to ambient, the calcined powder is again transferred to the impregnation vessel. To 188 g of a second charge of the saturated cobalt solution, 1.78 g of a 13.5% Ru solution of Ru(NO)(NO$_3$)$_3$ is added. This second impregnation solution is again applied to the substrate in the tumbling impregnator and dried and calcined as following the first pass.

EXAMPLE 9

Preparation of Catalyst Sample 9

MSA reagent solution was prepared with 27.8 g TEOS rapidly added to 1.33 L of acidified demineralized water under vigorous stirring. Sufficient HNO$_3$ was added to the water to bring the pH to between 2.2 and 2.5 and held between 3° C. and 8° C. 15 minutes after TEOS addition, an aliquot was removed and the rate of color change tested. Greater than 90% of the full color developed within 5 minutes. This MSA solution was kept cold and held for 60 hrs. In a separate stirred, heated vessel, a slurry of the alumina support containing 200 g alumina suspended in 667 ml demineralized water was heated. The slurry was held at 50° ±5° C. throughout the addition of the aged MSA reagent, which was added at a rate of 15 ml/min. The mixture was stirred and kept at 50° ±5° C. until >95% of the silicon was reacted with the alumina. Once reaction was complete, stirring was stopped, the solids allowed to settle, and the clear mother liquor decanted from the vessel. The remaining dense slurry was vacuum filtered to remove the remainder of the solution. The filtered solid was spread onto a drying tray to a thickness less than 1.5 cm and dried 6 h in a static muffle furnace held at 140° C. This dried powder was then calcined in a dish at 600° C. for 4 hours.

Catalyst was prepared to have a nominal composition of 20% Co, 1% La, and 0.1% Ru in the calcined form. 160 g of the Si-modified catalyst support were charged to a steam-jacketed, rotating impregnation vessel. A saturated solution prepared from $Co(NO_3)_3$ $6H_2O$ and demineralized water was prepared in advance. 138 g of this saturated Co solution was used for the first impregnation pass. 5.00 g of $La(NO_3)_3$ $6H_2O$ were dissolved in 15 g of demineralized water and combined with the Co solution. The amount of solution was selected so as to produce and incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≦2 cm. The dishes are placed into an electrically heated oven which is ramped from ambient to 120° C., held at 120° C. for 2 hours, ramped to 350° C. over a two hour period and held at 350° C. for an additional 2 hours. After cooling to ambient, the calcined powder is again transferred to the impregnation vessel. To 151 g of a second charge of the saturated cobalt solution, 1.44 g of a 13.5% Ru solution of $Ru(NO)(NO_3)_3$ is added. This second impregnation solution is again applied to the substrate in the tumbling impregnator and dried and calcined as following the first pass.

EXAMPLE 10

Preparation of Catalyst Sample 10

MSA reagent solution was prepared with 29.8 g TEOS rapidly added to 267 ml of acidified demineralized water under vigorous stirring. Sufficient $HNO_3$ was added to the water to bring the pH to between 2.2 and 2.5 and held between 3° C. and 8° C. 15 minutes after TEOS addition, an aliquot was removed and the rate of color change tested. Greater than 90% of the full color developed within 5 minutes. In a separate stirred, heated vessel, a slurry of the alumina support containing 200 g alumina suspended in 667 ml of demineralized water was heated. The slurry was held at 50° ±5° C. throughout the addition of the MSA reagent, which was added at a rate of 15 ml/min. Following completion of the MSA addition, the slurry was stirred and kept at 50° ±5° C. until >95% of the silicon was reacted with the alumina. Once reaction was complete, stirring was stopped, the solids allowed to settle, and the clear mother liquor decanted from the vessel. The remaining dense slurry was vacuum filtered to remove the remainder of the solution. The filtered solid was spread onto a drying tray to a thickness less than 1.5 cm and dried 6 h in a static muffle furnace held at 140° C. This dried powder was then calcined in a dish at 600° C. for 4 hours.

Catalyst was prepared to have a nominal composition of 20% Co, 1% La, and 0.1% Ru in the calcined form. 200 g of the Si-modified catalyst support were charged to a steam-jacketed, rotating impregnation vessel. A saturated solution prepared from $Co(NO_3)_2$ $6H_2O$ and demineralized water was prepared in advance. 172.5 g of this saturated Co solution was used for the first impregnation pass. 6.25 g of $La(NO_3)_3$ $6H_2O$ were dissolved in 20 g of demineralized water and combined with the Co solution. The amount of solution was selected so as to produce and incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≦2 cm. The dishes are placed into an electrically heated oven which is ramped from ambient to 120° C., held at 120° C. for 2 hours, ramped to 350° C. over a two hour period and held at 350° C. for an additional 2 hours. After cooling to ambient, the calcined powder is again transferred to the impregnation vessel. To 184 g of a second charge of the saturated cobalt solution, 1.78 g of a 13.5% Ru solution of $Ru(NO)(NO_3)_3$ is added. This second impregnation solution is again applied to the substrate in the tumbling impregnator and dried and calcined as following the first pass.

The catalysts produced in examples 1-10 were examined for attrition resistance 15 according to the following method. The catalyst was activated using hydrogen gas and 20cc of the activated catalyst are loaded into a 0.5 L CSTR and brought to synthesis conditions at 410° F., 300 psi, GHSV 8000/hr and a stirrer speed of 1000 rpm. After 50 hours of synthesis operation, conditions are adjusted to 420° F., 400 psi, GHSV 8000/hr and a stirrer speed of 2000 rpm. This condition is maintained for 150 hours. At the completion of a CSTR attrition test, the reactor is switched to a nitrogen purge and cooled to about 250° F. It is held under these conditions for about 24 hours, during which time whole catalyst and larger attrition fragments settle to the bottom of the reactor but fine attrition fragments remain suspended in the wax. The wax is then cooled until solid and removed from the reactor as a single plug. The catalyst-containing wax plug of the settled fraction can be separated from the overhead wax which contains the unsettled, smaller attrition-produced catalyst fragments. Once separated, the overhead wax fraction is granulated and homogenized after which a representative sample is taken. This representative fraction is placed into a pyrex beaker, placed into an oven held at between about 280 to about 320° F. and allowed to melt. A pyrex filtration system with a vacuum receiver is also heated to the oven temperature. The wax is filtered first through a 5 μm filter, the collected liquid then filtered through a 0.45 μm filter, with the collected liquid filtered a final time through a 0.1 μm filter. At each stage of filtration, a small amount of clean isopar solvent is used to sweep all of the material from the bottom of the vessel. At the conclusion of filtration, the filtrate residual solids content is determined by ashing. The filtered solids are separated from the filter papers using a solvent in an ultrasonic bath. The solids-bearing solvent is centrifuged to concentrate the solids which are finally collected, dried, and weighed. These masses are referenced to the original mass of catalyst loaded into the reactor and the results are shown in the Table contained in FIG. 4.

EXAMPLE 11

Reaction of MSA with Alumina 667 ml of demineralized water was acidified with $HNO_3$ to pH=2.0 and cooled to less than 8° C. with an ice bath. 74.63 g of TEOS were added to the acidified water with vigorous stirring. The rate of color change was tested after 15 minutes of mixing and showed >90% of maximum color within 5 minutes. In a separate vessel, 333 ml of demineralized water were combined with 100 g of Sasol Chemical SCCa-30/140 alumina and heated to 50° C. while mixing with an overhead mixer. The silicic acid reagent was added to the alumina slurry using a peristaltic pump over a period of 135 minutes. After three hours of mixing, the amount of unreacted silcic acid was found to be 35% of the initial charge. Care must be taken in this measurement to allow for the depolymerization of somewhat larger polymers of silicic acid. This higher degree of polymerization is brought about by the higher concentration of unreacted silicic acid, elevated temperature, and shift of pH from the point of optimal stability in this saturation preparation. The resulting deposition was self-limiting to about 5.7% Si on the calcined alumina.

COMPARATIVE EXAMPLE 1

Reaction of MSA with Silica 667 ml of demineralized water was acidified with $HNO_3$ to pH=2.0 and cooled to less than 8° C. with an ice bath. 13.9 g of TEOS was added to the acidified water with vigorous stirring. The rate of color change was tested after 15 minutes of mixing and showed >90% of maximum color within 5 minutes. In a separate vessel, 333 ml of demineralized water was combined with 10 g of silica gel (Davisil Grade 64b type 150a, available from Davison Catalysts) and heated to 50° C. while mixing with an overhead mixer. A background test of silicic acid formed in the slurry was done using the molybdate color change test. The silicic acid reagent was added to the silica slurry using a peristaltic pump over a period of 60 minutes. A first test of unreacted silica was done after one hour of mixing. From this test, it was determined that the background color change from the silica in water slurry contributed less than 5% of the total color change at that point. The amount of unreacted silicic acid remaining was determined hourly for a total of three hours, at which point 75% of the silicic acid remained unreacted in the solution. This resulting deposition was self-limiting to less than 0.5% Si on the calcined silica.

COMPARATIVE EXAMPLE 2

Reaction of MSA with Titania 667 ml of demineralized water was acidified with $HNO_3$ to pH=2.0 and cooled to less than 8° C. with an ice bath. 13.9 g of TEOS were added to the acidified water with vigorous stirring. The rate of color change was tested after 15 minutes of mixing and showed >90% of maximum color within 5 minutes. In a separate vessel, 333 ml of demineralized water was combined with 100 g of titania (Titania Type P-25, available from Degussa AG) and heated to 50° C. while mixing with an overhead mixer. The silicic acid reagent was added to the titania slurry using a peristaltic pump over a period of 60 minutes. A first test of unreacted silica was done after one hour of mixing, indicating 57% of the silicic acid remained unreacted. After three hours of mixing, the amount of unreacted silicic acid was found to be 36% of the original charge. This resulting deposition was self-limiting to slightly under 1% Si on the calcined titania.

COMPARATIVE EXAMPLE 3 AND EXAMPLE 11A

Deaggregated Gamma Alumina

A semiworks batch of catalyst, Example 11A, was prepared on a Sasol Chemical SCCa-30/140 alumina which had been modified to contain 3.0 $Si/nm^2$. A semiworks batch of catalyst, Comparative Example 3, was prepared on an unmodified Sasol Chemical SCCa-30/140 alumina. Example 11A was run in a proprietary Fischer-Tropsch synthesis in a 36 inch slurry bubble column reactor. Three runs using Comparative Example 3 were made, one each in 42 inch, 36 inch, and 6 inch slurry bubble columns using a proprietary Fischer-Tropsch synthesis. Wax samples were obtained at the filtered product outlet and analyzed for deaggregated alumina at comparable time on stream of 45 days. The results are given in Table 1 below. The deaggregated gamma alumina particles were separated from other Fischer-Tropsch catalyst attrition solids using a progressive filtration method. The wax sample is placed into a pyrex beaker, placed into an oven held at between about 280 and about 320° F. and allowed to melt. A pyrex filtration system with a vacuum receiver is also heated to oven temperature. The melted wax is subjected to a series of progressive filtrations using 5 μm, 0.45 μm, and 0.1 μm pass filters, sequentially. A final filtration is done using an Anodisc aluminum oxide filter membrane with a pass size of 0.02 μm. At each stage of filtration, a small amount of clean isopar solvent is used to sweep all of the material from the bottom of the vessel. The final filtrate is then ashed according to ASTM-486 and the deaggregated particulate content determined.

TABLE 1

| Sample | Reactor | Deaggregate Particulates |
| --- | --- | --- |
| Comparative Example 3 | 42 inch | 1700 ppm |
| Comparative Example 3 | 36 inch | 700 ppm |
| Comparative Example 3 | 6 inch | 1400 ppm |
| Example 11A | 36 inch | <10 ppm |

EXAMPLE 12

Distribution of Si within the Alumina Beads

Alumina support obtained from Sasol Chemical sold under the designation SCCa-30/140 is a spray-dried material consisting of spheroidal particles between 25 gm and 100 gm in diameter. To determine the profile of the Si within or on the support particles after treatment with the monosilicic acid reagent, samples of modified support were embedded in a polymer matrix mounted to a microscope slide and polished so as to reveal exposed cross-sections of whole particles. The polished slide was then examined with an SEM and sections along the diameter of several beads analyzed using energy dispersive X-ray analysis. When measured across many beads of different diameter, the Si/Al signal ratio was found to vary by roughly 10%, approximately consistent with the expected variability of the technique. Slightly higher Si/Al ratios, by approximately 15%, based on the average of several interior points on several beads, were observed at the extreme exterior edge of the beads. From these observations we conclude that the rate of reaction between the monosilicic acid and the alumina surface is sufficiently slow to allow for the diffusion of the reagent to all points within the beads.

EXAMPLE 13

Surface Si Enrichment in Polymerized Silicic Acid Reagent

The supports produced by the methods of examples 4 and 5, prior to any further treatment to form the catalyst particles, were analyzed using X-ray photoelectron spectroscopy (XPS). Each of the supports of examples 4 and 5 were modified to give 0.8% Si on the calcined support. The modified support of example 5 was prepared immediately upon preparation of the MSA reagent whereas the MSA used to produce the modified support of example 4 was first aged about 60 hours before reacting it with the alumina support. The rate of color change of the aged solution used to prepare the modified support of example 4 indicated that the silica had polymerized to a very high degree. XPS is extremely surface sensitive, providing information about the superficial surface in a layer roughly 5 nm deep. The catalyst beads were examined without supplemental preparation so as to restrict the analysis to only the true exterior surface of the beads. The Si/Al signal ratio was found to be 60% higher in the modified support of example 4 than in the modified support of example 5, indicating that the polymerized silicic acid was unable to penetrate the entire support particle before reacting with the alumina. As can be seen in the Table attached in FIG. 4, the modified support example 4 is less effective at mitigating attrition than the modified support of example 5.

EXAMPLE 14

Retained Attrition Resistance with Regeneration 200 g of Sasol Puralox SCCa-30/140 alumina was charged into a steam jacketed impregnation vessel. 37.04 g TEOS was added to 75 cc ethanol. The TEOS/EtOH mixture was added drop-wise to the alumina in the impregnation vessel. The mixture was allowed to mix at ambient temperature for 1 hour. Steam drying was started and continued for 3 hours. The alumina mixture was cooled and then transferred to ceramic calcining dishes. The alumina bed depth was <1.5 cm. The alumina was put into a static muffle furnace and ramped to 140° C. over ~30 mins. The alumina was held for 2 hours at 140° C. This dried powder was then ramped to 600° C. and calcined for 4 hours. This support material contained 2.5 $Si/nm^2$.

Catalyst was prepared to have a nominal composition of 20% Co, 1% La, and 0.1% Ru in the calcined form. 10 g of the Si-modified catalyst support were charged to a steam-jacketed, rotating impregnation vessel. A saturated solution prepared from $Co(NO_3)_2 \cdot 6H_2O$ and demineralized water was prepared in advance. 70.8 g of this saturated Co solution was used for the first impregnation pass. 3.13 g of $La(NO_3)_3 \cdot 6H_2O$ were dissolved in 10 g of demineralized water and combined with the Co solution. The amount of solution was selected so as to produce an incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≤2 cm. The dishes are placed into an electrically heated oven which is ramped from ambient to 120° C., held at 120° C. for 2 hours, ramped to 350° C. over a two hour period and held at 350° C. for an additional 2 hours. After cooling to ambient, the calcined powder is again transferred to the impregnation vessel. To 106.7 g of a second charge of the saturated cobalt solution, 0.9 g of a 13.5% Ru solution of $Ru(NO)(NO_3)_3$ is added. This second impregnation solution is again applied to the substrate in the tumbling impregnator and dried and calcined as following the first pass.

An initial 80 cc charge of catalyst prepared on a support treated with TEOS/EtOH, as described above in this Example, was run in a 1 liter CSTR under typical FT synthesis conditions, adjusting temperature and GHSV in order to maintain conversion above 55%. Following an initial operating period of 2000 hours, the catalyst was regenerated in accordance with procedures described in U.S. Pat. No. 6,812,179, the disclosure of which is incorporated herein by reference. The regenerated charge was again operated for 2000 hours and again regenerated. Following a third operating period of 2000 hours, the catalyst was recovered, dewaxed, and the particle size distribution measured. The initially loaded catalyst had a distribution with >99% of the particles larger than 20 μm in diameter. Alter the 6000 operating hours and 2 regenerations, the recovered catalyst still exhibited no detectable fines, still with >99% of the particles larger than 20 μm.

An initial 80 cc charge of catalyst prepared on a support treated with MSA so as to deposit 3.0 $Si/nm^2$, was run in a 1 liter CSTR under typical FT synthesis conditions, adjusting temperature and GHSV in order to maintain conversion above 55%. Following an initial operating period of 2000 hours, the catalyst was regenerated in accordance with procedures described in U.S. Pat. No. 6,812,179. The regenerated charge was again operated for 2000 hours and again regenerated. Following a third operating period of 1800 hours, the catalyst was recovered, dewaxed, and the particle size distribution measured. The initially loaded catalyst had a distribution with >99% of the particles larger than 20 μm in diameter. Adler the 5800 operating hours and 2 regeneration, the recovered catalyst still exhibited no detectable fines, with >99% of the particles larger than 20 μm.

EXAMPLE 15

Preparation of Catalyst Sample 15 (TEOS/EtOH Method)

350 g of Sasol SCCa-30/140 alumina was charged into a steam jacketed impregnation vessel. 25.9 g TEOS was added to 168 cc ethanol. The TEOS/EtOH mixture was added dropwise to the alumina in the impregnation vessel. The mixture was allowed to mix at ambient temperature for 1 hour. Steam drying was started and continued for 3 hours. The alumina mixture was cooled and then transferred to ceramic calcining dishes. The alumina bed depth was <1.5 cm. The alumina was put into a static muffle furnace and ramped to 140° C. over ~30 mins. The alumina was held for 2 hours at 140° C. This dried powder was then ramped to 600° C. and calcined for 4 hours.

Catalyst was prepared to have a nominal composition of 20% Co and 0.1% Ru in the calcined form. 200 g of the Si-modified catalyst support were charged to a steam-jacketed, rotating impregnation vessel. A saturated solution prepared from $Co(NO_3)_2 \cdot 6H_2O$ and demineralized water was prepared in advance. 172.45 g of this saturated Co solution was used for the first impregnation pass. The amount of solution was selected so as to produce an incipiently wet powder when applied to the support in the rotating vessel. The impregnated powder is allowed to tumble in the impregnator for one hour at ambient temperatures and then steamed to dryness over a three hour period. The powder is cooled to ambient, weighed, and transferred to shallow calcining dishes such that the powder depth is ≤2 cm. The dishes are placed into an electrically heated oven which is ramped from ambient to 120° C., held at 120° C. for 2 hours, ramped to 350° C. over a two hour period and held at 350° C. for an additional 2 hours. Alter cooling to ambient, the calcined powder is again transferred to the impregnation vessel. To 176.67 g of a second charge of the saturated cobalt solution, 1.75 g of a 13.5%

Ru solution of Ru(NO)(NO$_3$)$_3$ is added. This second impregnation solution is again applied to the substrate in the tumbling impregnator and dried and calcined as following the first pass.

EXAMPLE 16

Dispersion of Si on the Alumina Surface through XPS

Since the silicic acid is prone to polymerize, a question arises as to the possibility that higher oligomers begin to form as the concentration of Si on the alumina surface is increased. X-ray photoelectron spectroscopy (XPS) can be used to address this question. Since the signal observed by XPS derives from the outermost surface exposed to the excitation X-ray beam, usually 3-5 nm in depth, it is well suited to detect such changes in morphology. Even in the event that a single layer structure converts to a two layer structure, the second layer signal will be attenuated relative to the signal from the first layer. Consequently, a ratio of the observed Si/Al ratio as a function of surface coverage should show a deviation toward diminishing Si/Al detected as layered structures form, even if these layered structures are islands and not contiguous surfaces.

Since XPS is so superficial surface sensitive, the interior surfaces of the support needs to be made available for analysis. This was accomplished through mechanical grinding of the calcined supports followed by sieving through a 20 μm opening sieve. Particles fractured to be smaller than this dimension must expose a relatively high proportion of interior surface.

Figure 5:
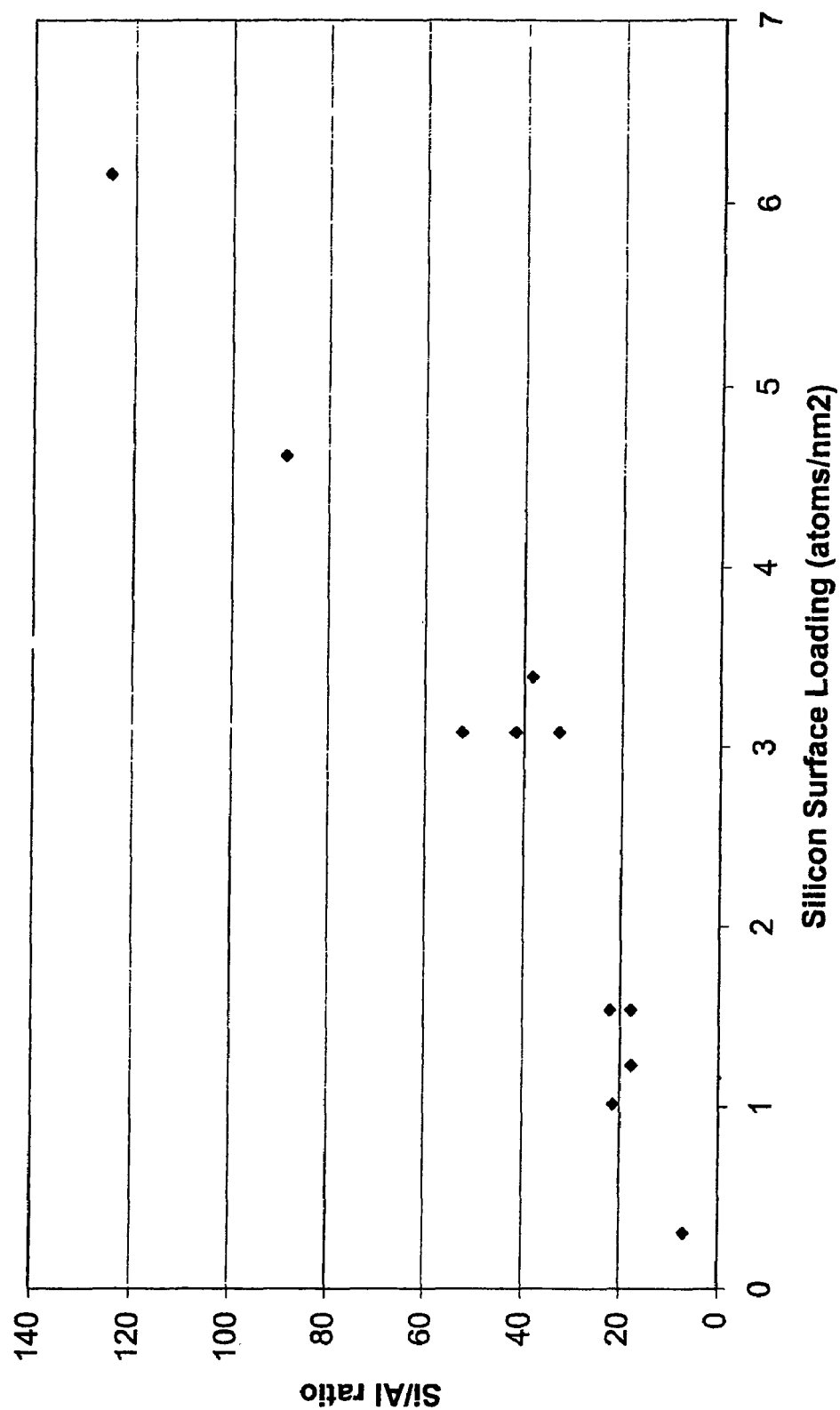
FIG. 5 is a graph showing ratio of Si to Al XPS intensity.

FIG. 5 shows the change in Si/Al ratio observed for samples with nominal Si loadings ranging from 0.3 Si/nm$^2$ through 6.2 Si/nm$^2$. The high degree of linearity clearly indicates that the morphology of the SiO$_2$ entities formed at the lowest, 0.3 Si/nm$^2$, Si concentration are the same as those formed at the highest concentration, 6.2 Si/nm$^2$. These observations indicate that the SiO$_2$ deposited most likely binds as individual entities in a single layer on the Al$_2$O$_3$ surface.

EXAMPLE 17

Textural Evidence for Uniform Deposition

Nitrogen adsorption can be used to monitor changes in surface area, pore volume, and average pore diameter as a function of Si loading onto the alumina surface. In the event that polymeric entities begin to form, blockage of pores can occur, resulting in a discontinuous change in pore volume with increased loading. Similarly, blockages change the effective average pore diameter. The following table shows the textural data obtained at several different nominal Si loadings. All three textural parameters show continuous behavior, particularly the average pore diameter, consistent with a continuous deposition of SiO$_2$ onto the alumina surface.

| | Sample | Surface Area m$^2$/g | BJH Desorption N$_2$ Pore Volume(cc/g) | BJH Desorption Average Pore Diameter(nm) |
|---|---|---|---|---|
| | unmodified | 140.49 | 0.44 | 8.28 |
| 3.1 | Si/nm$^2$ on 30/140 | 138.4 | 0.41 | 8.42 |
| 4.6 | Si/nm$^2$ on 30/140 | 133.15 | 0.38 | 7.84 |
| 6.2 | Si/nm$^2$ on 30/140 | 135.6 | 0.37 | 7.67 |
| 8.5 | Si/nm$^2$ on 30/140 | 139.3 | 0.33 | 7.08 |
| 8.8 | Si/nm$^2$ on 30/140 | 142.96 | 0.32 | 6.75 |

While the invention has been described with a limited number of embodiments, these 20 specific embodiments are not intended to limit the scope of the invention as otherwise described and claimed herein. Modification and variations from the described embodiments exist. A person of ordinary skill in the art recognizes parameters for the formation of semiconductor materials processes may vary, for example, in temperature, pressure, gas flow rates, and so on. Therefore, materials which do not fulfill the selection criteria under one set of process conditions may nevertheless be used in embodiments of the invention under another set of process conditions. The incorporation of additional elements may result in beneficial properties which are not otherwise available. Also, while the processes are described as comprising one or more steps, it should be understood that these steps may be practiced in any order or sequence unless otherwise indicated. These steps may be combined or separated. Finally, any number disclosed herein should be construed to mean approximate, regardless of whether the word "about" or "approximate" is used in describing the number. The appended claims intend to cover all such variations and modifications as falling within the scope of the invention.

What is claimed is:

1. A method of preparing an improved Fischer-Tropsch catalyst, comprising the steps of:
   contacting an alumina support material with monosilicic acid to provide a treated catalyst support having between about 0.3 atoms Si/nm$^2$ and about 6.2 atoms Si/nm$^2$ deposited thereon wherein the Si atoms are bound directly to the alumina through an oxygen atom; and
   impregnating the treated catalyst support with a material selected from the group consisting of cobalt, ruthenium, lanthanum, and combinations thereof to form the Fischer-Tropsch catalyst.

2. The method of claim 1 wherein the monosilicic acid contacts the alumina support material at a temperature between about 0° C. and about 95° C.

3. The method of claim 1 wherein the monosilicic acid contacts the alumina support material such that the pH is between about 1.5 and about 3.5.

4. The method of claim 1 wherein the silicon is deposited on the alumina support material between about 0.55 atoms Si/nm$^2$ and about 5.0 atoms Si/nm$^2$.

5. The method of claim 1 wherein the silicon is deposited on the alumina support material between about 0.70 atoms Si/nm$^2$ and about 3.5 atoms Si/nm$^2$.

6. The method of claim 1 wherein the alumina support material is preformed.

7. The method of claim 1 further comprising the step of:
   drying the treated catalyst support at a temperature between about 100° C. and about 200° C.

8. The method of claim 1 wherein the amount of cobalt is between about 10.0% by weight and about 30.0% by weight based on the total weight of the Fischer-Tropsch catalyst.

9. The method of claim 1 wherein the amount of ruthenium is between about 0.03% by weight and about 0.30% by weight based on the total weight of the Fischer-Tropsch catalyst.

10. The method of claim 1 wherein the amount of lanthanum is between about 0.5% by weight and about 2.0% by weight based on the total weight of the Fischer-Tropsch catalyst.

11. The method of claim 1 further comprising the step of:
calcining the Fischer-Tropsch catalyst at a temperature of between about 250° C. and about 500° C.

12. The method of claim 1 wherein the Fischer-Tropsch catalyst is regenerated.

13. The method of claim 1 wherein the Fischer-Tropsch catalyst is greater than 99% free of particles having a diameter less than 20 μm.

14. A method of preparing an improved Fischer-Tropsch catalyst, comprising the steps of:
contacting an alumina support material with monosilicic acid thereby to provide a treated catalyst support having between about 0.3 atoms $Si/nm^2$ and about 10.6 atoms $Si/nm^2$ deposited thereon wherein the Si atoms are bound directly to the alumina through an oxygen atom; and
impregnating the treated catalyst support with a material selected from the group consisting of a Group VIII metal, a modifier, an activator, and combinations thereof to form the Fischer-Tropsch catalyst.

15. The method of claim 14 wherein the Group VIII metal is present between about 10.0% by weight and about 30.0% by weight based on the material which impregnates the treated catalyst support.

16. The method of claim 15 wherein the Group VIII metal is cobalt.

17. The method of claim 14 wherein the modifier is selected from the group consisting of Ca, Sc, Ba, La, Hf, and combinations thereof.

18. The method of claim 14 wherein the activator is selected from the group consisting of Ru, Rh, Pd, Re, Ir, Pt, and combinations thereof.

19. The method of claim 14 wherein the Fischer-Tropsch catalyst is greater than 99% free of particles having a diameter less than 20 μm.

20. A method of preparing an improved Fischer-Tropsch catalyst, comprising the steps of:
contacting an alumina support material with monosilicic acid at a pH between about 2.2 to about 2.5 thereby to provide a treated catalyst support having between about 0.3 atoms $Si/nm^2$ and about 6.2 atoms $Si/nm^2$ deposited thereon wherein the Si atoms are bound directly to the alumina through an oxygen atom;
drying the treated catalyst support at a temperature between about 100° C. and about 150° C.; and
impregnating the treated catalyst support with at least about 20% by weight of cobalt, at least about 0.1% by weight of ruthenium, at least about 1.0% by weight of lanthanum, and combinations thereof based on the total weight of the Fischer-Tropsch catalyst.

* * * * *